United States Patent
Tölle

(10) Patent No.: US 6,706,294 B1
(45) Date of Patent: Mar. 16, 2004

(54) METHOD FOR PRODUCING FOODSTUFFS, DIETETIC FOODSTUFFS AND FOOD ADDITIVES ON THE BASIS OF GRAIN STILLAGE

(76) Inventor: Marc Tölle, Bockumer Strasse 171, Düsseldorf (DE), 40489

( * ) Notice: Subject to any disclaimer, the term of this patent is extended or adjusted under 35 U.S.C. 154(b) by 0 days.

(21) Appl. No.: 10/048,453

(22) PCT Filed: Jul. 21, 2000

(86) PCT No.: PCT/EP00/07035

§ 371 (c)(1),
(2), (4) Date: Jun. 6, 2002

(87) PCT Pub. No.: WO01/10245

PCT Pub. Date: Feb. 15, 2001

(30) Foreign Application Priority Data

Aug. 5, 1999 (DE) .......................... 199 36 957

(51) Int. Cl.[7] .................................................. A23L 1/30
(52) U.S. Cl. ........................................... 426/52; 426/43
(58) Field of Search ............................. 426/49, 52, 43, 426/61, 14, 648

(56) References Cited

FOREIGN PATENT DOCUMENTS

| DE | 3904962 A1 | 8/1990 |
|----|----|----|
| GB | 2066038 A | 11/1980 |
| WO | WO 89/01025 | 2/1989 |

*Primary Examiner*—Keith Hendricks
(74) *Attorney, Agent, or Firm*—Jacobson Holman PLLC

(57) ABSTRACT

A process for producing foods, dietetic foods and food additives based on distillers' grains in which the distillers' grains are directly taken from the distilling kettle, thickened, but not dried, and fermented with milk and a yoghurt or butter culture, wherein certain conditions with respect to pressure concentration, temperatures etc. are to be observed in the further processing in order to obtain optimum results.

11 Claims, No Drawings

METHOD FOR PRODUCING FOODSTUFFS, DIETETIC FOODSTUFFS AND FOOD ADDITIVES ON THE BASIS OF GRAIN STILLAGE

This application is a 371 National stage of PCT/EP00/07035, filed Jul. 21, 2000.

The present invention relates to a process for producing foods, dietetic foods and food additives based on distillers' grains in which the distillers' grains are directly taken from the distilling kettle, thickened, but not dried, and admixed with milk and a yoghurt culture. Such a process is known from DE-C-39 04 962. This process has proven useful, but from time to time, quality variations occurred and thus products were obtained which were not optimal in terms of taste and smell. Thus, it has been the object of the invention to improve and optimize the process according to DE 39 04 962 C2 and to be able to further process the product obtained thereby into a wide variety of final products.

Now, this object has been achieved by the following process:

a) distillers' grains are thickened under a pressure of from 100 to 800 mbar, preferably about 700 mbar, to about from 15 to 19% dry matter, preferably to from 16 to 18% dry matter;

b) mixed with milk which has already been inoculated with the yoghurt culture or a butter culture;

c) either the mixture obtained is fermented with yoghurt culture at a temperature of from 38 to 48° C., preferably from 40 to 44° C., for 10 to 15 hours, preferably for 12 to 15 hours, or the mixture obtained is fermented with a butter culture at a temperature of from 18 to 24° C., preferably from 20 to 22° C., for up to 36 hours, preferably for 26 to 30 hours; followed by d) mixing with additional milk or milk concentrate and cooling to temperatures of below 15° C.

Of critical importance to the process is, firstly, the thickening under reduced pressure within the pressure range mentioned, because pressures of above 800 mbar tend to produce agglutinations, and pressures of less than 100 mbar are associated with excessively high production costs. Further important is the demanded range of from 15 to 19, preferably from 16 to 18%, dry matter since such products can be readily processed further with a high economic efficiency and are freed from all disturbing odorous substances. Thus, during research into the required dosing quantity, it has been established that each ready-to-consume portion should contain from 21 to 25 grams dry matter fraction of the mixtures with yoghurt and butter cultures, preferably from 22 to 23 grams. This corresponds to about 135 grams of the thickened mass with 17% dry matter. This mass, admixed with additional ingredients, yields tasty selling units and consuming portions of from 200 to 250 grams formulated ready to consume.

For such ready-to-consume products, the following are suitable, in particular:
 milk preparations
 fruit preparations
 vegetable preparations.

Further, it has proven useful not to admix the thickened distillers' grains first with milk and then with a yoghurt culture or butter culture, but to admix it with milk already inoculated with the yoghurt culture or butter culture. These mixtures are fermented under the above mentioned conditions, wherein care should be taken that the fermentation will be stopped by cooling, at the latest, when the pH value has dropped to 4.7, preferably 4.9. Butter cultures of lactic bacteria can provide a milder taste for the final product.

This fermentation with a yoghurt culture or butter culture of the distillers' grains previously fermented with yeast is capable of reliably and with high efficiency degrading the last disturbing flavors. In addition, it has been found that residual sugars and carbohydrates are also metabolized into lactic acid in this fermentation, so that the product contains even less sugars and carbohydrates and is thus even more suitable for diabetics, and in addition obtains a better storage stability.

After completion of this fermentation, the product is mixed with additional milk or milk concentrate and cooled down to temperatures of below 15° C. This brings the fermentation to a complete standstill, and a further decrease of the pH value does not occur, which would not be acceptable in terms of taste.

The thus obtained product is preferably spray-dried, whereby it becomes storable with virtually no limitation. Due to the spray-drying, the yoghurt culture loses its viability so that the fermentation cannot resume even when the product is moistened later.

In addition, this cooled product may also be stored and shipped and directly processed further into ready meals, provided that the yoghurt culture or butter culture is acceptable therein. It is even possible to provide this product with further fermentable additives which will then influence the properties of the final product. I t has been found that honey, lecithins and/or soybean proteins form complex compounds with distillers' grains. Due to chemical-physical interactions between the lecithins, proteins and the individual groups of substances from the distillers' grains (e.g., residual carbohydrates, fats), multicomponent systems are formed. In their chemical, physical and biological behavior, these are substantially different from their individual components, which is the basis of their manifold effects.

If desired, both the spray-dried product and the not yet spray-dried product can be admixed with minerals, vitamins, flavors, flavoring agents and colorants and thus varied to become products having a wide variety of tastes. However, it is a common feature of all these products that their taste and smell is no longer reminiscent of distillers' grains and are therefore accepted by broad circles of consumers. Highly appreciated additives include fruit, vegetable and/or milk preparations with sweetening agents or fructose, especially when the products are to remain suitable for diabetics or for weight reduction.

Further, it is possible to spray honey or aqueous solutions of honey onto the finished product, wherein temperatures of above 60° C. should be avoided and care should be taken that no aggregates or agglutinations are produced. Honey not only improves the taste, but also increases the content of trace elements, vitamins, enzymes, certain amino acids and easy-to-digest nutrients, so that such products can also be employed as a supplementary diet during slimming cures, during recovery after operations or illness etc. Further, the products are suitable as dietetic foods for the treatment of amino acid deficiency diseases, pancreatic functional disorders, carbohydrate addiction diseases and intestinal functional disorders. The quantity of honey is preferably near about 5% by weight, based on the thickened distillers' grains. Instead of honey, up to 15% by weight of date paste, which is more suitable for diabetics, may also be used.

Of course, if desired, distillers' grains may also be digested by milling in a ball mill or by ultrasonication after having been removed from the distilling kettle, in accordance with DE 39 04 962. However, comminution and homogenization in a high-pressure homogenizer is more useful. This is preferably effected on the fresh grains obtained from the distillation plant while still hot and prior to the thickening under pressure. Homogenization may take place, for example, under a pressure of from 800 to 1000 bar, or by repeated homogenizations under 300 to 400 bar. Suitable equipment is constructed and supplied, for example, by Niro Soavi of Lübeck (Germany). Homogenization is preferably effected at temperatures around 90° C.

Finally, it has been found that the thus prepared improved products can be employed as food supplements, especially together with further additives, wherein the products themselves already contain valuable components of food supplements due to their high content of roughage, minerals, vitamins and proteins from yeast and milk.

The consistency of the products can be adjusted by additions such as xanthan, guar gum and modified starch. If the heating times are kept short enough so that the components and active substances are not deteriorated or destroyed, the product may even be subjected to cooking extrusion together with small quantities of starch to form, for example, snacks or flakes, which are more accepted by the consumer as compared to ready-to-mix powder mixtures. It is also possible to compress the powders into chewing tablets, which certainly does not bring about damage to the components and active substances.

What is claimed is:

1. A process for producing foods, dietetic foods and food additives based on distillers' grains in which the distillers' grains are directly taken from the distilling kettle, thickened, but not dried, and fermented with milk and a yoghurt or butter culture, characterized in that
   a) distillers' grains are thickened under a pressure of from 100 to 800 mbar to about from 15 to 19% dry matter; then
   b) mixed with milk which has already been inoculated with the yoghurt culture or butter culture;
   c) either the mixture obtained is fermented with yoghurt culture at a temperature of from 38 to 48° C. for 10 to 20 hours, or the mixture obtained is fermented with a butter culture at a temperature of from 18 to 24° C. for up to 36 hours; followed by
   d) mixing with additional milk or milk concentrate and cooling to temperatures of below 15° C.

2. The process according to claim 1, characterized in that the thickening in step a) is effected at a pressure of about 700 mbar and taken to from 16 to 18% dry matter.

3. The process according to claim 1, characterized in that fermentation in step c) is at 40 to 44° C. for 12 to 15 hours for a yoghurt culture, or at 20 to 22° C. for 20 to 30 hours for a butter culture.

4. The process according to claim 1, characterized in that the fermentation is stopped by cooling, at the latest, when the pH value has dropped to 4.7.

5. The process according to claim 1, characterized in that the product is subsequently spray-dried.

6. The process according to claim 1, characterized in that the product is sprayed with honey, aqueous solutions of honey or date paste.

7. The process according to claim 1, characterized in that the product is cooled, stored and shipped without spray-drying and processed further into ready meals.

8. The process according to claim 1, characterized in that the hot distillers' grains are comminuted in a high-pressure homogenizer prior to being thickened.

9. A method of using the product prepared according to claim 1, comprising incorporating said product into a food supplement.

10. A method of using the product prepared according to claim 1, comprising incorporating said product into tablets, snacks, flakes or extrudates.

11. A method of using the product prepared according to claim 1, comprising incorporating said product into
    ready-to-drink products;
    spoon-ready yoghurt preparations;
    spoon-ready whole food dessert meals;
    ready-to-mix muesli preparations;
    ready-to-mix dry products for preparing diet portions and meals, and for preparing whole-food desserts.

* * * * *